United States Patent
Glasz et al.

(10) Patent No.: US 10,182,191 B2
(45) Date of Patent: Jan. 15, 2019

(54) CAMERA RIG FOR SIMULTANEOUS RECORDING

(71) Applicants: Michael Glasz, Montreal (CA); Mishka Komai, Los Angeles, CA (US); Matthew Pittman, Los Angeles, CA (US); Zach Wechter, Los Angeles, CA (US)

(72) Inventors: Michael Glasz, Montreal (CA); Mishka Komai, Los Angeles, CA (US); Matthew Pittman, Los Angeles, CA (US); Zach Wechter, Los Angeles, CA (US)

(*) Notice: Subject to any disclaimer, the term of this patent is extended or adjusted under 35 U.S.C. 154(b) by 125 days.

(21) Appl. No.: 15/453,860

(22) Filed: Mar. 8, 2017

(65) Prior Publication Data
US 2018/0262692 A1    Sep. 13, 2018

(51) Int. Cl.
*H04M 1/04* (2006.01)
*G03B 17/55* (2006.01)
*G03B 17/56* (2006.01)
*H04N 5/247* (2006.01)
*H04B 1/3888* (2015.01)

(52) U.S. Cl.
CPC ............ *H04N 5/247* (2013.01); *G03B 17/55* (2013.01); *G03B 17/561* (2013.01); *G03B 17/563* (2013.01); *H04B 1/3888* (2013.01); *H04M 1/04* (2013.01)

(58) Field of Classification Search
CPC ...... H04N 5/247; H04N 5/225; H04N 5/2253; G03B 17/55; G03B 17/561; G03B 17/563; F16M 13/04; F16M 11/041; H04M 1/04; H04B 1/3888
See application file for complete search history.

(56) References Cited

U.S. PATENT DOCUMENTS

| 7,542,073 | B2* | 6/2009 | Li | H04N 13/243 348/218.1 |
| 9,615,035 | B2* | 4/2017 | Ocampo | H04M 1/04 |
| 2013/0005401 | A1* | 1/2013 | Rosenhan | G06F 1/1626 455/557 |
| 2014/0340577 | A1* | 11/2014 | Ocampo | H04M 1/04 348/376 |
| 2018/0210322 | A1* | 7/2018 | Malukhin | G03B 17/561 |

* cited by examiner

*Primary Examiner* — John Villecco
(74) *Attorney, Agent, or Firm* — Edwin Tarver

(57) ABSTRACT

A camera rig for simultaneous recording holds a first smartphone with a first interactive touch screen, a second smartphone with a second camera, and a third smartphone with a third camera. The camera rig includes a handle, a first mount configured for holding the first smartphone orienting the first interactive touch screen oriented toward a user, a second mount adjacent the first mount is configured for holding the second smartphone with the second camera facing the user, and a third mount overlays the first mount. The third mount is configured for holding the third smartphone with the third camera oriented away from the user. Three simultaneous footage streams of the same event are then edited into a single clip.

16 Claims, 4 Drawing Sheets

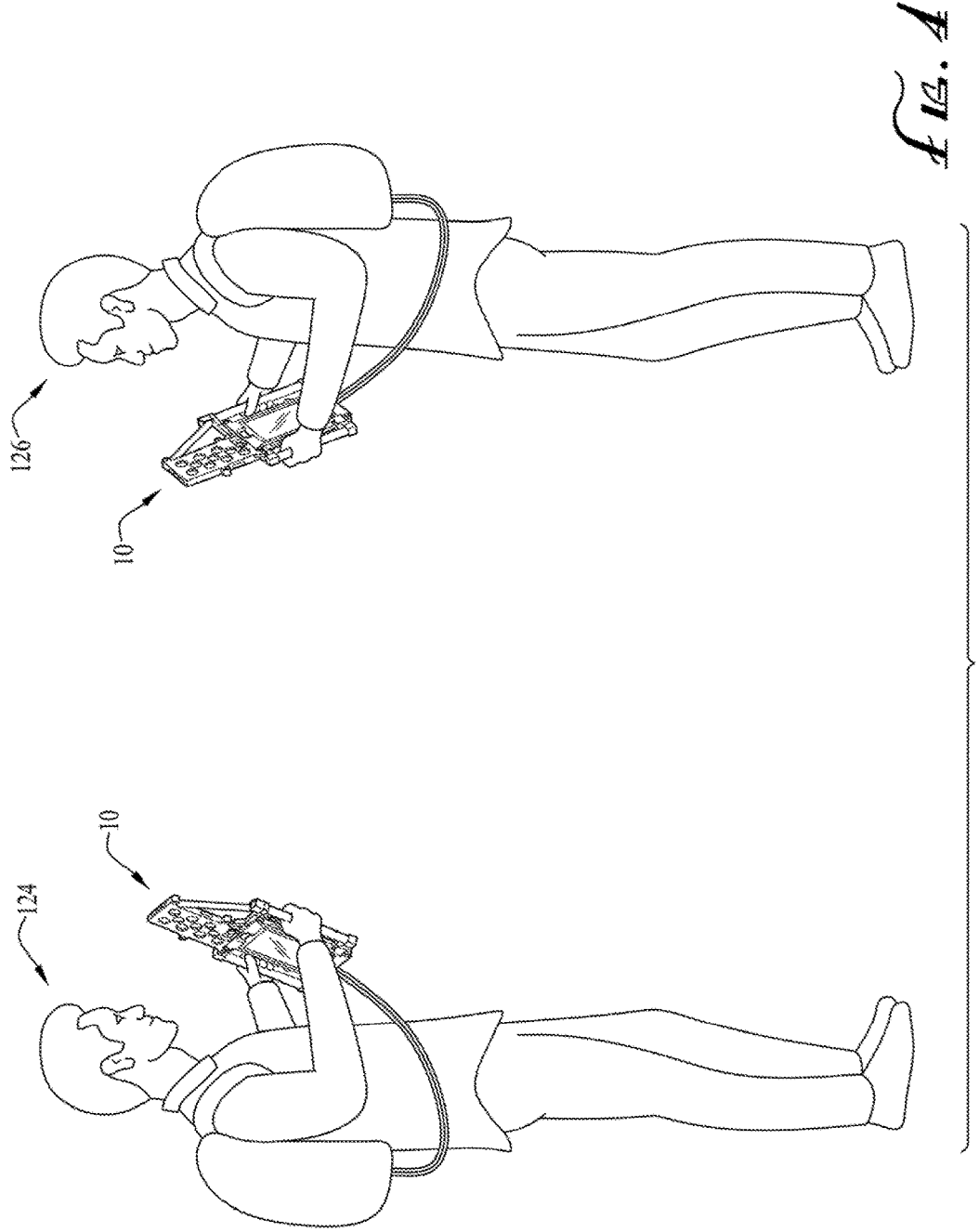

CAMERA RIG FOR SIMULTANEOUS RECORDING

BACKGROUND

Field of the Invention

The present invention generally relates to camera rigs. More specifically, the present invention relates to a camera rig for holding and operating multiple smartphone-based cameras in recording and interactive modes Related Art Camera rigs for motion pictures are known in the art, typically comprising a tripod or similar support with a pan and tilt head on which a motion picture camera is installed. Conventional camera rigs generally accommodate only a single motion picture camera. For effect shots in which the same event is to be shown from different angles, it is common to use two, three or more cameras, all recording footage at the same time. A problem occurs when these multiple different views of the same event are desired from a single perspective at substantially the same location.

To solve this problem, custom rigs have been designed, typically having multiple heads onto which two or more cameras can be mounted. Due to the size of conventional motion picture cameras, these apparatus are typically unwieldy and incapable of capturing close-up action. They are also expensive due to their frequently custom-designed nature, and thus are suitable for only a limited number of camera setups. With the advent of professional quality cameras on modern smartphones, some of these size considerations have been minimized.

With the ongoing evolution of smartphone technology, and ever increasing use of smartphones by the general public, it is increasingly common for motion pictures and other filmed entertainment to show representations of characters interacting with smartphones, or interacting with other characters through smartphones. While screen capture technology enables a video recording of a smartphone interactive screen as a character interacts with it, a problem persists in that cutting between the smartphone user, the smartphone screen, and the user's (or smartphone camera) field of view is complicated to film, and virtually impossible to record simultaneously in real time.

Hence, what is needed is a camera rig that holds multiple smartphone-based cameras for recording multiple perspectives, including the interactive touch screen of a smartphone, in order to create simultaneous streams of footage that can be edited into a single stream of footage, cutting between these views without the limitations of existing techniques.

SUMMARY

In one embodiment, a camera rig is disclosed for simultaneous recording, the camera rig holding a first smartphone with a first interactive touch screen, a second smartphone having a second camera, and a third smartphone having a third camera. The camera rig includes a handle, a first mount configured for holding the first smartphone with the first interactive touch screen oriented to face a user, a second mount adjacent the first mount, the second mount configured for holding the second smartphone with the second camera facing the user, and a third mount overlaying the first mount, the third mount configured for holding the third smartphone with the third camera oriented away from the user. Preferably the third mount is offset front the first mount, such that a first camera on the first smartphone is unobstructed.

The camera rig handle in one embodiment comprises separate left and right handles on either side of the first mount, but may have any variety of handle for effective manipulation of the camera rig when installed with the smartphones therein. A first front face plate fame is provided for retaining the first smartphone in the first mount. Preferably the first front face plate includes a first face plate frame. The frame surrounds the interactive touch screen of the first smartphone and comprises a home button cut-out and a speaker cut-out for enabling conventional use of the first smartphone when installed in the camera rig.

The second mount preferably holds the second smartphone in an inverted orientation relative to the first smartphone when installed in the camera rig. Thus the second camera is held proximal to the first interactive touch screen, enabling a simulated view outward from the interactive touch screen. Due to the second mount being located adjacent the first mount, a strut is preferably provided for anchoring the second mount in a static position relative to the first mount. A third face plate is hingedly coupled to the third mount allowing installation of the third smartphone. The face plates are preferably held in position using a plurality of screw tabs and screws that anchor the first face plate, a second face plate and the third face plate to the camera rig. The camera rig preferably also includes a plurality of vents tor releasing heat generated by the first smartphone, the second smartphone, and the third smartphone.

The camera rig may also be broadly described as a structure having a first mount, a second mount adjacent the first mount, and a third mount at least partially overlaying the first mount. The first mount has a removable first face plate, the second mount has a removable second face plate, and the third mount has a removable third face plate. A spacer wall is provided between the first mount and the third mount with a spacer wall frame to allow access to the third mount through the first mount.

In use, the camera rig permits a method of simultaneous filming. In a preferred embodiment, steps taken in executing the method include providing a first smartphone with a first interactive touch screen, providing a second smartphone with a second camera, and providing a third smartphone with a third camera. The first interactive touch screen is oriented toward a user, the second camera is aimed at the user, and the third camera is aimed in the direction of the user's field of view. The first smartphone, the second smartphone and the third smartphone are releaseably anchored in the camera rig in a predetermined configuration relative to one another.

With the smartphones anchored in position, the simultaneously record action on the first interactive touch screen, action in view of the second camera, and action in view of the third camera, creating three temporally overlapping video streams. In one embodiment, a first camera is provided on the first smartphone, proximal the third camera, and the second smartphone may be inverted relative to the first smartphone, thereby bringing the second camera proximal the first interactive touch screen. It is contemplated that multiple camera rigs will be provided to multiple users for generating numerous simultaneous recordings. Preferably the first smartphone, second smartphone, and third smartphone are simultaneously activated, and once transferred, the simultaneously recorded action is edited into a single stream of footage.

BRIEF DESCRIPTION OF THE FIGURES

FIG. 4 illustrates a side view of two characters, each holding an individual camera rig, while filming the first smartphone screen, the characters, and their surroundings.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Figure 1:
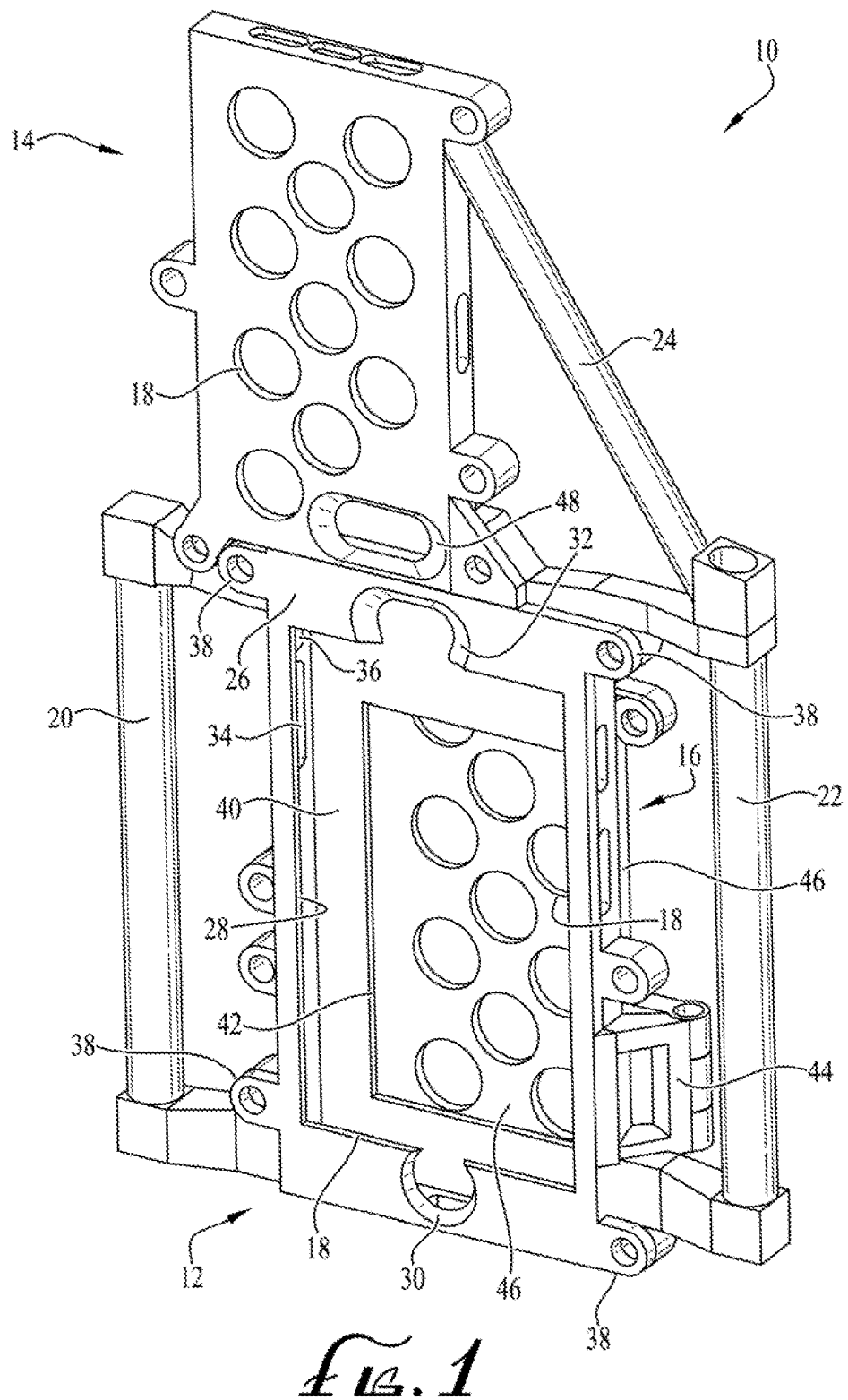
FIG. 1 illustrates a perspective view of a camera rig for holding three smartphones for simultaneous filming.
Figure 2:
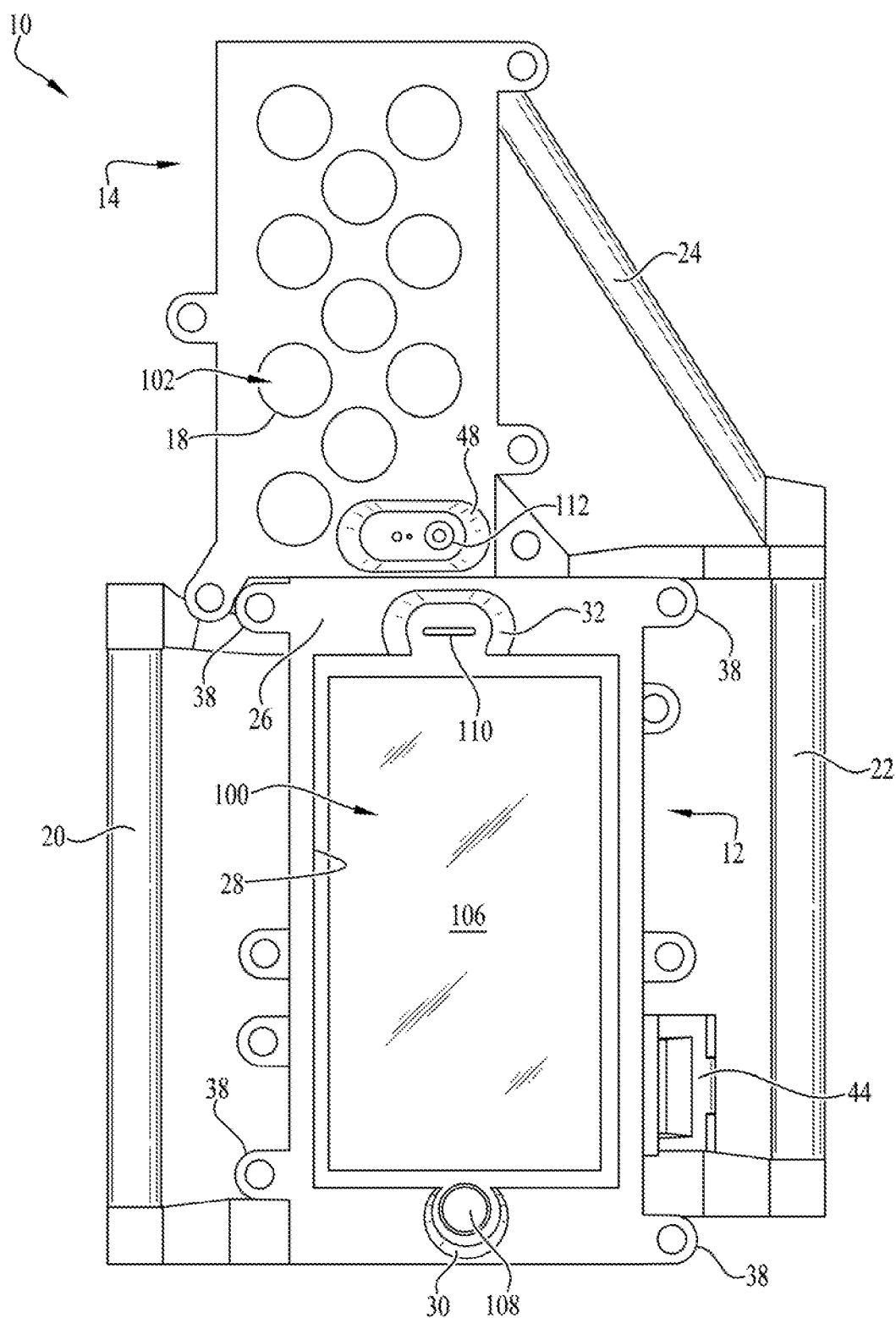
FIG. 2 illustrates a front view of the camera rig with a first smartphone and a second smartphone installed therein.
Figure 3:
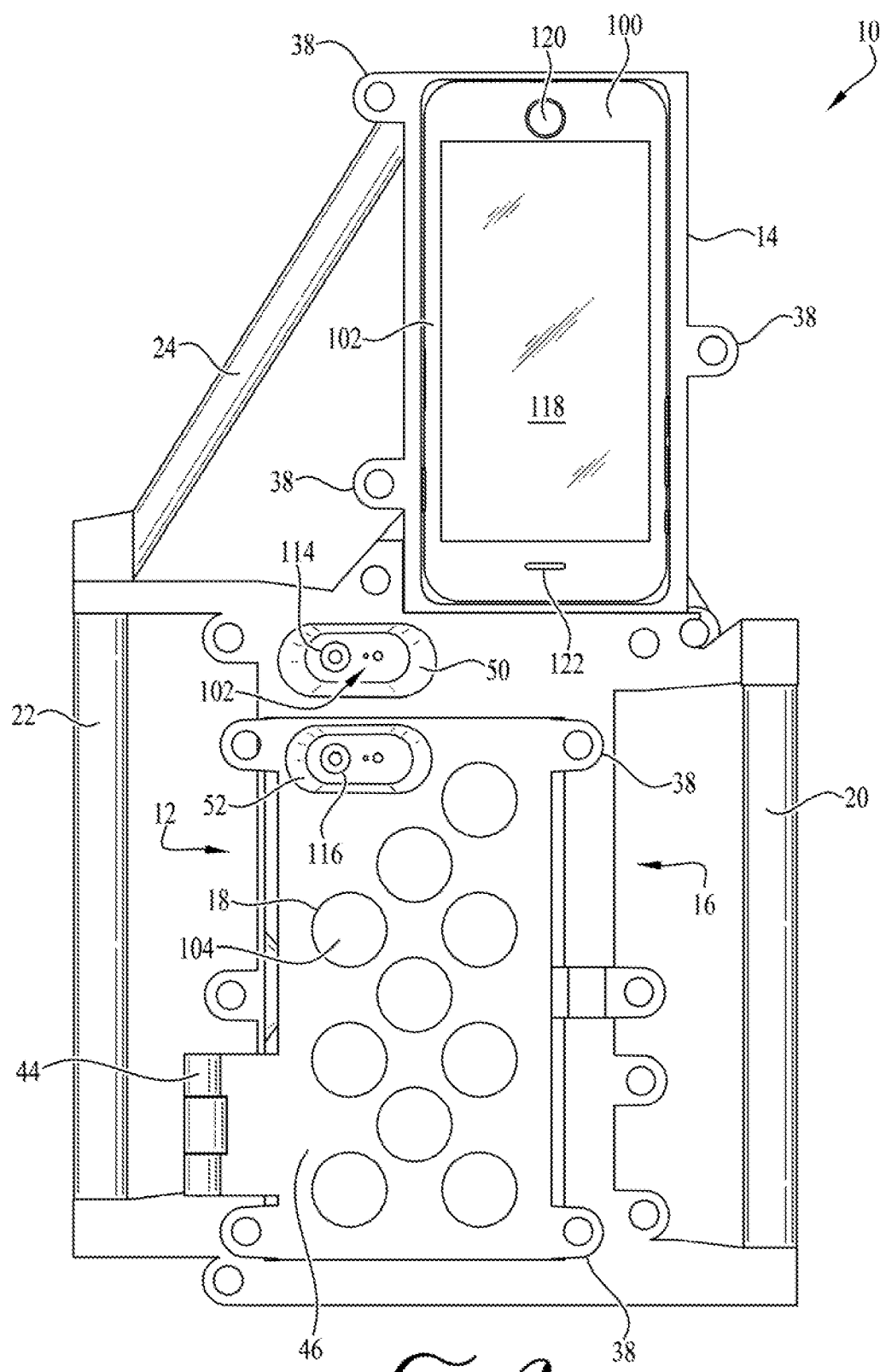
FIG. 3 illustrates a rear view of the camera rig with a second smartphone and a third smartphone installed therein.

Referring to FIG. 1, the camera rig 10 includes a first mount 12, a second mount 14 and a third mount 16, each sized and shaped to accommodate a first smartphone 100, second smartphone 102 and third smartphone 104 (see, FIGS. 2-4). Although the term "smartphone" is used herein, it is to be understood other similar camera-enabled handheld computing devices are contemplated, inasmuch as the telephonic features of a smartphone are not necessarily required for operation of the camera rig 10. In one preferred embodiment, the second mount 14 and the third mount 16 each include vents 18 for dissipating heat generated by the second smartphone 102 and third smartphone 104, and other venting may be provided as necessary.

In a preferred embodiment, a left handle 20 and a right handle 22 are provided on opposite sides of the first mount 12 for manipulating the camera rig 10. Although the illustrated embodiment shows the left handle 20 and the right handle 22 as two cylindrical members extending from either side of the camera rig 10, other contemplated embodiments may include a single handle, multiple handles, or any arrangement sufficient for allowing a single user to manipulate the camera rig 10 with one or two hands. For added stability, a strut 24 is provided to help anchor the second mount 14 in position, extending from the first mount 12 to help preventing the second mount 14 from bending under the weight of the second smartphone 102 when installed, and also to provide an additional gripping feature allowing a user to manipulate the camera rig 10.

Still, referring to FIG. 1, a first face plate 26 is provided for retaining the first smartphone 100 in the first mount 12. The first face plate 26 provides a face plate frame 28 allowing a user to view and access the first interactive touch screen 106 (i.e., the controls) of the first smartphone 100. Preferably the first face plate 26 also includes cut-out features such as a home button cut-out 30 and a speaker cut-out 32, which allow a user to employ the first smartphone 100 while the first smartphone 100 is installed in the camera rig 10, including during filming. In various embodiments, similar cut-out features may be provided for the second mount 14 and third mount 16 as well according to preference.

In order to allow full functionality of first smartphone 100, additional cut-outs such as a volume cut-out 34 and ringer mute cut-out 36 among others are preferably incorporated into the first mount 12, including for charging and data transfer associated with the first smartphone 100 when installed in the camera rig 10. It should be understood that the number and placement of the home button cut-out 30, speaker cut-out 32, volume control cut-out 34, ringer mute cut-out 36, and other features of the first mount 12 and first fees plate 26 will be adapted for different smartphone models according to which particular smartphone (or similar device) is used in the camera rig. It is also contemplated that the first mount 12, second mount 14, and third mount 16 may be configured to hold different smartphone models, and thus may have differently arranged cut-out portions.

Still referring to FIG. 1, in the illustrated embodiment, the first face plate 26 is preferably secured to the camera rig 10 using a series of screw tabs 38 extending from the first face plate 26 and from the camera rig 10 in various places. Screws (not shown) engage the screw tabs 38 to anchor the first face plate 26 to the first mount 12 without damaging or interfering with the first smartphone 100. Although screw tabs 38 are shown in the illustrated embodiment, other closure features may be used as appropriate, provided they don't interfere with operation of the first smartphone 100, second smartphone 102 or third smartphone 104.

In order to prevent the first smartphone 100 and third smartphone 104 from touching, and to provide a cooling space in addition to the vents 18, a spacer wall 40 is preferably placed between the front mount 12 and the third mount 16. The spacer wall 40 preferably has a spacer wall frame 42, similar to the face plate frame 28, which enables users to access a third interactive touch screen (i.e., the controls) of the third smartphone 104 when the first smartphone 100 is removed from the first mount 12. The spacer wall frame 42 also helps allow cooling of the first smartphone 100 and the third smartphone 104.

The third smartphone 104 is held in the third mount 16 by a third face plate 46, similar to the first face plate 26. The third face plate 46 is preferably anchored to the camera rig 10 using a hinge 44, that allows the third face plate 46 to swing away from the camera rig 10 while remaining securely anchored thereto.

Referring to FIG. 2, the camera rig 10 is shown with the first smartphone 100 and second smartphone 102 installed therein. The first smartphone 100 is located in the first mount 12, retained by the first face plate 26, with the first interactive touch screen 106 accessible through the face plate frame 28. The first smartphone 100 includes a first home button 108 and first speaker 110, which are accessible through the home button cut-out 30 and the speaker cut-out 32 of the first face plate 26.

The second smartphone 102 is preferably installed in the second mount 14 in an inverted orientation, thus positioning a second camera 112 (i.e., the camera of the second smartphone 102) as close as possible to the first interactive touch screen 106. Having the second camera 112 proximal the first interactive touch screen 106 enables filming a user interacting with the first smartphone 100 as close to the point of view of the first smartphone 100 as possible, and a second camera cut-out 48 is provided in the second mount 14 for this purpose. With the first smartphone 100 in the first mount 12 and the second smartphone 102 in the second mount 14, simultaneous recordings can be made of a user in the field of view of the second camera 112 as well as animations and action occurring on the first interactive touch screen 106 of the first smartphone 100 using a software-based screen recording feature. The simultaneous recordings can be retained and downloaded for future editing to produce a single clip of footage.

Referring to FIG. 3, a rear view of the camera rig 10 is shown with the second smartphone 102 installed in the second mount 14 and the third smartphone 104 installed in the third mount 16. The third face plate 46 of the third mount 16, like the first face plate 26, preferably includes a series of vents 18 for heat dissipation. In a preferred embodiment the third mount 16, while overlaying the first mount 12, is positioned slightly lower relative to the first mount 12 thus enabling a first camera 114 (i.e., the camera of the first smartphone 100) to have an unobstructed forward view out of a first camera cut-out 50, while also enabling a third camera 116 (i.e., of the third smartphone 104) a similar view through a third camera cut-out 52.

The off-set arrangement of the third mount 16 relative to the first mount 12 allows recording of both a camera rig 10 point-of-view angle by the third camera 116 (of the third smartphone 104), and video recording by the first camera 114 of the first smartphone 100. Thus, an image of the area in front of the camera rig 10 can be represented as a point of view (by the third camera 116) and as a visual representation of the image as it appears on the first interactive touch screen 106, taken by the first camera 114. Preferably the first smartphone 100 and third smartphone 104 are only slightly off-set, and share a common orientation, so that the first camera 114 and the third camera 116 share a substantially common field of view.

Also shown in FIG. 3, the second mount 14 is shown without the second face plate 54 (not shown) which normally covers the second smartphone 102, to show the inverted orientation of the second smartphone 102 when installed in the camera rig 10. In various embodiments, the second face plate 54, like the first faceplate 26 and third faceplate 46, includes similar features such as a frame for accessing the second interactive touch screen 118, and various control cut-outs for accessing the second home button 120, second speaker 122, among other features, etc.

Referring to FIG. 4, a first user (or character) 124 and a second user (or character) 126 is shown operating individual camera rigs 10. While the illustrated embodiment shows both users 124/126 having backpacks 128 for housing accessories such as extra batteries, additional memory storage, etc., the backpacks may be omitted altogether in other embodiments according to preference, with the first smartphone 100, second smartphone 102 and third smartphone 104 self-powered and connected.

When activated in each camera rig 10, the first smartphone 100, second smartphone 102 and third smartphone 104 produce three recorded video streams. The first is an video image of the first interactive touch screen 106 of the first smartphone as a user interacts with it, showing the selection of icons, screen animations and other similar actions (not shown) reflected on the first interactive touch screen 106. The second stream is a view of the user taken by the second camera 112 of the second smartphone 102 installed in the second mount 12 and proximal to the first interactive touch screen 106. The third stream is a view of the area in front of the user taken by the third smartphone 104 using the third camera 116 in the lower rear mount 16. This view can represent both the view of the first smartphone 100 or the view of the user depending on how the camera rig 10 is manipulated by the user.

Once filming is complete, the three simultaneously recorded video streams can be saved and eventually transferred into non-linear editing software, thus enabling the production of a single video clip that cuts back and forth among the views in real time, producing an effect that cannot be achieved using currently available techniques.

The structure of the camera rig 10 having been shown and described, its method of operation will now be discussed. While the use of a single camera rig 10 is discussed herein, it is contemplated that two camera rigs 10, as shown in FIG. 4, or three or more camera rigs 10 may be employed as necessary to produce a desired effect.

In order to use the camera rig 10, a user opens the third face plate 46, which may be accomplished by loosening screws (either conventional screws, thumb screws, or any other similar attachment) holding the third face plate 46 in place and swinging the third faceplate 46 away from the camera rig 10. The third smartphone 104 is placed in the third mount 16 and the third face plate 46 closed, such that the third camera 116 appears in the third camera cut-out 52. With no first smartphone 100 installed, inverting the camera rig 10 allows access to the second interactive touch screen through the spacer wall frame 42 of the spacer wall 40.

With the third smartphone 104 locked in place in the third mount 16 behind the third face plate 46, the second smartphone 102 may be installed in the upper mount 14, and secured in place by the second faceplate 54, ensuring that the second smartphone 102 is inverted such that the second camera 112 appears in the second camera cut-out 48. The first smartphone 100 is installed in the first mount 12, such that the first interactive touch screen 106 appears in the first face plate 26. While the first smartphone 100, second smartphone 102 and third smartphone 104 may be installed in any order, the third smartphone 104 is preferably installed prior to the first smartphone 100 to allow user interaction with the third smartphone 104 in setting up the third camera 116 for recording.

Before or after the first smartphone 100, second smartphone 102 and third smartphone 104 are installed in the camera rig 10, they may be connected to one or more sources for controlling their record functions (i.e., the recording functions of the first camera 114, second camera 112, third camera 116, and screen activity recording of the first interactive touch screen 106). Optionally, the smartphones 100/102/104 may be connected in parallel or connected in series to such a controller, and they may also be connected to an external power source, such as a portable external battery. Once installed, connected, and powered on, the camera rig 10 is ready for use.

When recording is activated, the first smartphone 100 carries out a recording of the first interactive touch screen 106 thereby showing user's activity, including use of apps such as messaging, web browsing, map usage, or other functionality. Simultaneously, the second smartphone 102 carries out a recording of the user, using the second camera 112. Thus, as the user engages the first interactive touch screen 106, simultaneous footage of both the user engaging the first interactive touch screen 106 and an image of the actual first interactive touch screen 106 and changes occurring on it is captured. In addition to the first smartphone 100 recording the first interactive touch screen 106 and the second smartphone 102 recording simultaneous footage of the user, the third smartphone 104 records the view in front of the user using the third camera 116.

The resulting footage comprises three simultaneously recorded clips from each of the smartphones 100/102/104. When recording is concluded, the three clips, including any additional clips produced by additional camera rigs (10) may be saved and transferred to video editing software and edited together into a single clip. In the resulting edited, single clip, views of the user's point of view, the user, and the user's screen can be shown, switching back and forth, and edited in unconventional ways. In an exemplary embodiment of such a clip, two camera rigs are used to create a scene involving two characters as follows:

The exemplary scene may begin with a view of a first interactive touch screen 106 being operated, intercut with footage of the first character 124 before, during and after the activity on the first interactive touch screen 106 is shown. The first character is filmed from the second camera 112 on the second smartphone 102, and since the second smartphone 102 is inverted such that the second camera 112 is proximal the first interactive touch screen 106, the view of the first character 124 appears to be from the perspective of the first interactive touch screen 106. After the first character 124 is shown, the point of view of the first character 124 may be shown, consisting of footage taken from the third camera 116 of the third smartphone 104, and intercut with footage of the user and first interactive touch screen 106.

Thus the resulting edited clip shows the first character's 124 interaction with the phone, identifies the first character 124, and identifies the first character's surroundings. In such an example, the first smartphone 100, second smartphone 102 and third smartphone 104 all record the entire action, and the three full length clips are edited to seamlessly jump from a view of the first character's 124 (first) smartphone 100, to the first 124 character interacting with it, and then the first character's 124 view, establishing setting. Given that the three unedited clips record the full length of the scene, an editor is free to cut between the views, enabling an audience's view to jump from the first character 124 to the first character's 124 field of view and the first character's 124 (first) smartphone 100 any number of times, and in any order.

Continuing with the exemplary scene, a second character 126 may also be provided, holding and operating a second camera rig 10. In the resulting footage, views of the second character's 126 first interactive touch screen 106 may be shown, followed by the second character 126 viewed to the second camera 112, and optionally, the second character's 126 field of view through the third camera 116. The six streams of footage from the first character 124 and the second character 126 can then be cut together to represent a typical smartphone interaction.

One such instance of a smartphone-based character interaction involves a simple phone call. In a more complex type of character interaction, the camera rig 10 enables showing an effective representation of an online social media interaction between the first character 124 and the second character 126, by intercutting views of the characters 124/126, their respective surroundings, and in particular, interactions occurring on their respective first interactive touch screens 106, which may show user operation, evolving text messages, and interaction with apps, including views produced by the first smartphone 100, second smartphone 102 or third smartphone 104.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A camera rig for simultaneous recording, and holding a first smartphone with a first interactive touch screen, a second smartphone having a second camera, and a third smartphone having a third camera, the camera rig comprising:
   a handle;
   a first mount configured for holding the first smartphone with the first interactive touch screen oriented to face a user;
   a second mount adjacent the first mount, the second mount configured for holding the second smartphone with the second camera facing the user; and
   a third mount overlaying the first mount, the third mount configured for holding the third smartphone with the third camera oriented away from the user, wherein the third mount is offset from the first mount, such that a first camera on the first smartphone is unobstructed.

2. The camera rig of claim 1 wherein the handle comprises a left handle and a right handle on either side of the first mount.

3. The camera rig of claim 1 further comprising a first front face plate frame for retaining the first smartphone in the first mount.

4. The camera rig of claim 3, wherein the first face plate frame comprises a home button cut-out and a speaker cut-out for enabling conventional use of the first smartphone.

5. The camera rig of claim 1 wherein the second mount holds the second smartphone inverted relative to the first smartphone for holding the second camera proximal the first interactive touch screen.

6. The camera rig of claim 1 further comprising a strut for anchoring the second mount relative to the first mount.

7. The camera rig of claim 1 further comprising a third face plate hingedly coupled to the third mount.

8. The camera rig of claim 1 further comprising a plurality of screw tabs for anchoring the first face plate and the third face plate to the camera rig.

9. The camera rig of claim 1 further comprising a plurality of vents for releasing heat generated by the first smartphone, the second smartphone, and the third smartphone.

10. A camera rig for simultaneous recording, comprising:
    a first mount, a second mount adjacent the first mount and a third mount at least partially overlaying the first mount;
    the first mount having a removable first face plate;
    the second mount having a removable second face plate;
    the third mount having a removable third face plate; and
    a spacer wall between the first mount and the third mount with a spacer wall frame to allow access to the third mount through the first mount.

11. A method of simultaneous filming, comprising the steps of:
    providing a first smartphone with a first interactive touch screen;
    providing a second smartphone with a second camera;
    providing a third smartphone with a third camera;
    orienting the first interactive touch screen toward a user;
    aiming the second camera at the user;
    aiming the third camera in the direction of the user's field of view;
    releasably anchoring the first smartphone, the second smartphone and the third smartphone in a camera rig in a predetermined configuration relative to one another; and
    simultaneously recording action on the first interactive touch screen, action in view of the second camera, and action in view of the third camera.

12. The method of claim 11 including the step of providing a first camera on the first smartphone, proximal the third camera.

13. The method of claim 11 including the step of inverting the second smartphone relative to the first smartphone, thereby bringing the second camera proximal the first interactive touch screen.

14. The method of claim 11, including the step of providing multiple camera rigs to multiple users.

15. The method of claim 11, including the step of simultaneously activating the first smartphone, second smartphone, and third smartphone.

16. The method of claim 11, further comprising the step of editing the simultaneously recorded action into a single stream of footage.

* * * * *